(12) United States Patent
Kimura et al.

(10) Patent No.: US 10,839,561 B2
(45) Date of Patent: Nov. 17, 2020

(54) IMAGE RETRIEVAL DEVICE AND METHOD, PHOTOGRAPH TIME ESTIMATION DEVICE AND METHOD, REPETITIVE STRUCTURE EXTRACTION DEVICE AND METHOD, AND PROGRAM

(71) Applicant: NIPPON TELEGRAPH AND TELEPHONE CORPORATION, Tokyo (JP)

(72) Inventors: Akisato Kimura, Atsugi (JP); Yoshitaka Ushiku, Atsugi (JP); Kunio Kashino, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/713,191

(22) Filed: Dec. 13, 2019

(65) Prior Publication Data
US 2020/0118297 A1 Apr. 16, 2020

Related U.S. Application Data

(62) Division of application No. 15/742,764, filed as application No. PCT/JP2016/070686 on Jul. 13, 2016, now Pat. No. 10,580,166.

(30) Foreign Application Priority Data

Jul. 15, 2015 (JP) ................................. 2015-141629

(51) Int. Cl.
*G06T 7/00* (2017.01)
*G06F 16/583* (2019.01)
(Continued)

(52) U.S. Cl.
CPC ............ *G06T 7/97* (2017.01); *G06F 16/5838* (2019.01); *G06K 9/468* (2013.01); *G06K 9/4628* (2013.01); *G06K 9/6271* (2013.01)

(58) Field of Classification Search
CPC .. G06F 16/5838; G06K 9/4628; G06K 9/468; G06K 9/6271; G06T 7/97
See application file for complete search history.

(56) References Cited

U.S. PATENT DOCUMENTS 9,104,946 B2 * 8/2015 Dusberger ........... G06K 9/4676
2006/0015494 A1 * 1/2006 Keating ............. G06F 16/5838
(Continued)

FOREIGN PATENT DOCUMENTS

| JP | H11-308513 A | 11/1999 |
|----|--------------|---------|
| JP | 2012-088881 A | 5/2012 |
| JP | 2013-021635 A | 1/2013 |

OTHER PUBLICATIONS

X. Li et al., Geo-visual Ranking for Location Prediction of Social Images. In ICMR, 2013.
(Continued)

*Primary Examiner* — Jingge Wu
(74) *Attorney, Agent, or Firm* — Harness, Dickey & Pierce, P.L.C.

(57) ABSTRACT

A repetitive structure extraction device includes an image feature extraction unit which extracts an image feature for each of a plurality of images which are captured at one or a plurality of locations and which are given different capture times, a temporal feature extraction unit which extracts, for each of the plurality of images, a temporal feature according to a predetermined period from a capture time given to the image, and a repetitive structure extraction unit which learns, on the basis of the image feature extracted for each of the plurality of images by the image feature extraction unit and the temporal feature extracted for each of the
(Continued)

plurality of images by the temporal feature extraction unit, a repetitive structure which is used to perform interconversion between the temporal feature and a component of the image feature and which is provided according to a correlation of periodic change between the component of the image feature and the temporal feature.

8 Claims, 9 Drawing Sheets

(51) Int. Cl.
*G06K 9/46* (2006.01)
*G06K 9/62* (2006.01)

(56) References Cited

U.S. PATENT DOCUMENTS

| | | | | |
|---|---|---|---|---|
| 2006/0015496 A1* | 1/2006 | Keating | ............... | G06F 16/5838 |
| 2009/0141982 A1* | 6/2009 | Suzuki | ............... | G06K 9/00335 |
| | | | | 382/190 |
| 2010/0080419 A1* | 4/2010 | Okugi | ............... | G06T 7/20 |
| | | | | 382/104 |
| 2012/0281146 A1* | 11/2012 | Yamada | ............. | H04N 5/23248 |
| | | | | 348/607 |
| 2012/0281922 A1* | 11/2012 | Yamada | ............... | G06T 7/246 |
| | | | | 382/201 |
| 2013/0010095 A1* | 1/2013 | Aoki | ............... | G06K 9/00268 |
| | | | | 348/77 |
| 2013/0016920 A1 | 1/2013 | Matsuda et al. | | |
| 2013/0021374 A1 | 1/2013 | Miao et al. | | |
| 2013/0279755 A1* | 10/2013 | Senda | ............... | G06K 9/3241 |
| | | | | 382/103 |
| 2014/0185882 A1* | 7/2014 | Masuura | ............ | H04N 5/23267 |
| | | | | 382/107 |
| 2015/0099946 A1 | 4/2015 | Sahin | | |
| 2015/0223731 A1 | 8/2015 | Sahin | | |
| 2017/0091573 A1* | 3/2017 | Ruan | ................ | G06N 5/02 |

OTHER PUBLICATIONS

G. Kim et al., Joint Summarization of Large-scale Collections of Web Images and Videos for Storyline Reconstruction. In CVPR, 2014.
G. Schindler et al., Inferring Temporal Order of Images From 3D Structure. In CVPR, 2007.
R. Martin-Brualla et al., Time-lapse Mining from Internet Photos. In SIGGRAPH, 2015.
Jia et al., Caffe: Convolutional architecture for fast feature embedding. arXiv preprint arXiv:1408.5093, 2014.
K. E. van de Sande et al., Evaluating Color Descriptors for Object and Scene Recognition. TPAMI, 32(9):1582-1596, 2010.
K. Komatsu et al., "Context Joho o Riyo shita Jinbutsu Shikibetsu no Kairyo to Kikai Gakusyu no tekiyo", IPSJ Symposium Meeting on Image Recognition and Understanding (MIRU) 2011, Apr. 2, 2014 (received date), pp. 623 to 630.
T. Ishikawa et al., "Yochien Seikatsu o Kiroku shita Eizo no Yoyaku", Image Lab, Dec. 10, 2011; vol. 22, No. 12, pp. 8 to 14.
International Search Report for PCT/JP2016/070686, ISA/JP, Tokyo, dated Nov. 10, 2016.
Requirement for Restriction Election regarding U.S. Appl. No. 15/742,764, dated Jul. 29, 2019.

* cited by examiner

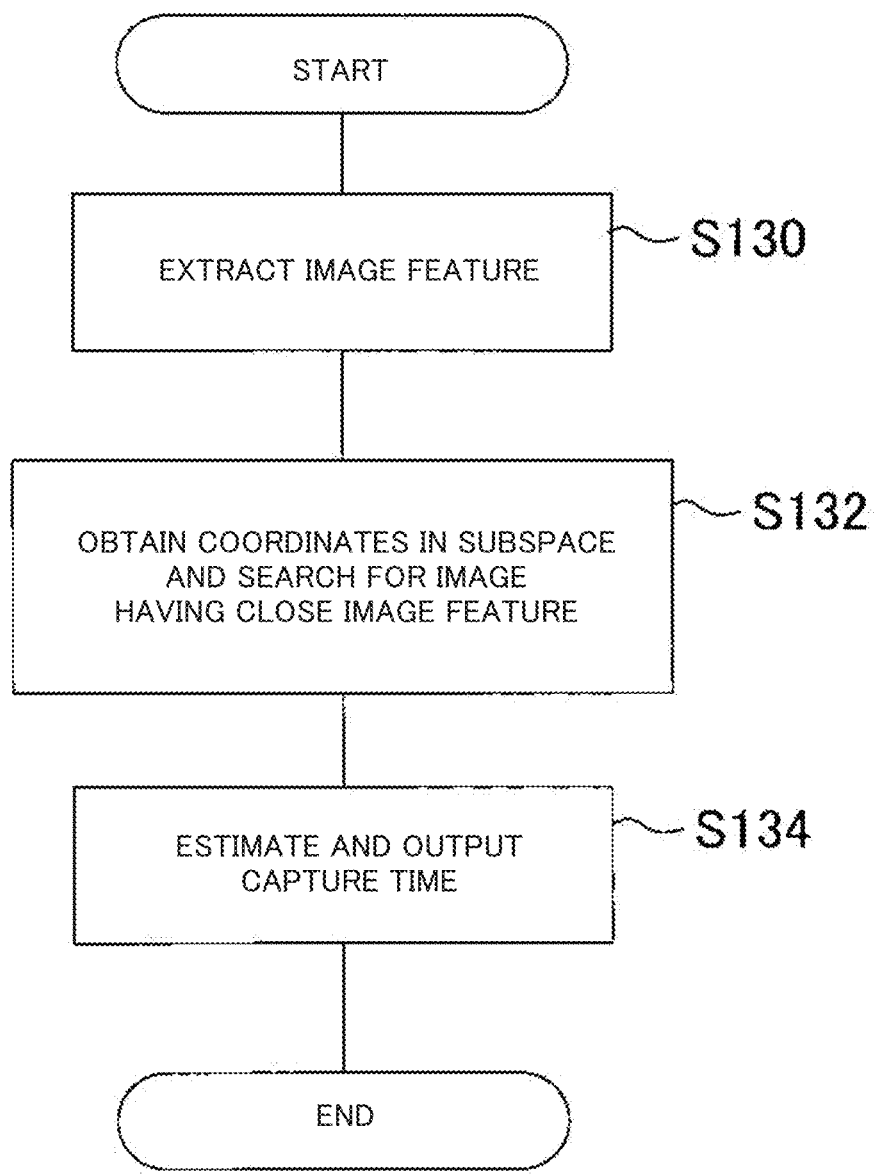

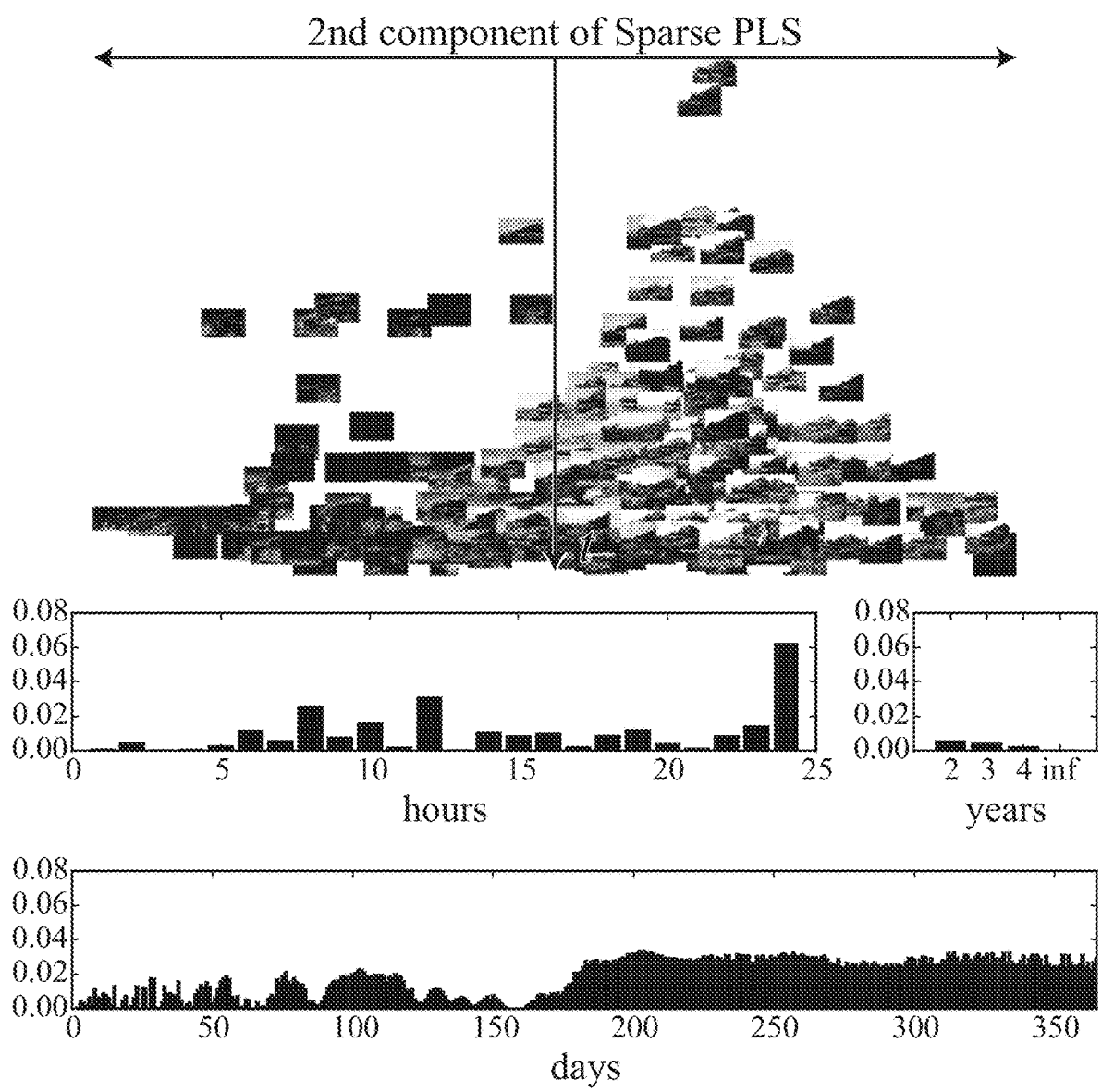

IMAGE RETRIEVAL DEVICE AND METHOD, PHOTOGRAPH TIME ESTIMATION DEVICE AND METHOD, REPETITIVE STRUCTURE EXTRACTION DEVICE AND METHOD, AND PROGRAM

CROSS-REFERENCE TO RELATED APPLICATIONS

This application is a divisional of U.S. application Ser. No. 15/742,764, filed Jan. 8, 2018, which is a 371 U.S. National Stage of International Application No. PCT/JP2016/070686, filed Jul. 13, 2016. This application claims the benefit of and priority to Japanese Patent Application No. 2015-141629, filed Jul. 15, 2015. The entire disclosures of the above applications are incorporated herein by reference.

TECHNICAL FIELD

The present invention relates to an image search device and method, a capture time estimation device and method, a repetitive structure extraction device and method, and a program.

Priority is claimed on Japanese Patent Application No. 2015-141629, filed Jul. 15, 2015, the content of which is incorporated herein by reference.

BACKGROUND ART

A great number of images have come to exist on the web with the proliferation of social media having image sharing functions such as Facebook (registered trademark), Instagram (registered trademark), and Flickr (registered trademark). Further, images posted through these social media are accompanied by auxiliary information such as capture times and capture positions such that images can be searched for on the basis of various types of information. For example, Google Maps (registered trademark) implements a function of displaying images on a map at locations at which they were captured.

However, since such information is transmitted from devices of consumers, images are mostly accompanied by erroneous auxiliary information due to clocks being out of sync or the accuracy of the GPS being low or are posted with such auxiliary information being set private for protecting privacy. Thus, many methods which enables image search by learning the relationship between such information and the content of the images have been proposed. For example, Non-Patent Document 1 suggests a method in which images to which capture location information similar to that of an input image is attached are searched for and the ranks of search results are updated on the basis of capture locations of the images to estimate a capture location of the input image from capture location information attached to images ranked high in the search results.

However, the proposal of a system which similarly enables image search with respect to time information, a method which solves the lack of capture times as auxiliary information, i.e., which enables image search even for an image group including many images of time zones in which no images were captured, or the like has hardly undertaken. In some attempts in the related art, the length of time to which attention is to be paid is limited in advance to simplify complex changes of images with respect to time. Non-Patent Document 2 proposes a method of expressing representative image transitions with the lapse of time in a graph structure for each day on which common events are likely to occur all day from morning till evening as on the Independence Day of the United States. Non-Patent Document 3 proposes a method of expressing gradually changing townscape states over a long period of several years or more with a three-dimensional time-stamped model. Non-Patent Document 4 models townscape or natural transitions which are changes over medium to long terms such as several months to several years, but this can be regarded as similar to the above technologies in the sense that it discards changes over a short period such as changes over a day to simplify complex changes.

CITATION LIST

Non-Patent Literature

[Non-Patent Document 1]
X. Li, M. Larson, and A. Hanjalic, "Geo-visual Ranking for Location Prediction of Social Images," inICMR, 2013.
[Non-Patent Document 2]
G. Kim, L. Sigal, and E. P. Xing, "Joint Summarization of Large-scale Collections of Web Images and Videos for Storyline Reconstruction," in CVPR, 2014.
[Non-Patent Document 3]
G. Schindler, F. Dellaert, and S. B. Kang, "Inferring Temporal Order of Images From 3D Structure," in CVPR, 2007.
[Non-Patent Document 4]
R. Martin-Brualla, D. Gallup, and S. M. Seitz, "Time-lapse Mining from Internet Photos," in SIGGRAPH, 2015.

SUMMARY OF INVENTION

Technical Problem

However, in the above methods, the length of time over which images change is limited and therefore there is a problem that it is not possible to deal with changes of images over various lengths of time at each location.

The present invention has been made in view of the above problems and it is an object of the present invention to provide an image search device and method and a program which can capture image changes according to various lengths of time for a group of images collected at a specific location, thereby enabling search for an image corresponding to an arbitrary time.

It is another object of the present invention to provide a capture time estimation device and method and a program which can capture image changes according to various lengths of time for a group of images collected at a specific location, thereby enabling estimation of a time at which an image was captured.

It is another object of the present invention to provide a repetitive structure extraction device and method and a program which can capture image changes according to various lengths of time for a group of images collected at a specific location, thereby enabling learning of a repetitive structure for searching for an image corresponding to an arbitrary time.

Solution to Problem

A first embodiment of the present invention is a repetitive structure extraction device including an image feature extraction unit configured to extract an image feature for each of a plurality of images which are captured at one or a plurality of locations and which are given different capture times, a temporal feature extraction unit configured to extract, for each of the plurality of images, a temporal feature according to a predetermined period from a capture time given to the image, and a repetitive structure extraction unit configured to learn, on the basis of the image feature extracted for each of the plurality of images by the image feature extraction unit and the temporal feature extracted for each of the plurality of images by the temporal feature extraction unit, a repetitive structure which is used to perform interconversion between the temporal feature and a component of the image feature and which is provided according to a correlation of periodic change between the component of the image feature and the temporal feature.

A second embodiment of the present invention is the repetitive structure extraction device according to the first embodiment, wherein the temporal feature extraction unit is configured to extract the temporal feature including a plurality of variables according to a plurality of different predetermined periods from the capture time given to the image, and the repetitive structure extraction unit is configured to learn, on the basis of the image feature extracted for each of the plurality of images by the image feature extraction unit and the temporal feature extracted for each of the plurality of images by the temporal feature extraction unit, the repetitive structure which is used to perform interconversion between a selected one of the plurality of variables of the temporal feature and a component of the image feature and which is provided according to a correlation of periodic change between the component of the image feature and the selected variable of the temporal feature.

A third embodiment of the present invention is the repetitive structure extraction device according to the first or second embodiment, wherein the repetitive structure extraction unit is configured to learn the repetitive structure at each of the locations on the basis of the image features extracted from the images captured at the same location and the temporal features extracted from capture times given to the images captured at the same location.

A fourth embodiment of the present invention is the repetitive structure extraction device according to the first or second embodiment, wherein the repetitive structure extraction unit is configured to learn the repetitive structure on the basis of the image features extracted from the images captured at the plurality of locations, the temporal features extracted from capture times given to the images captured at the plurality of locations, and features representing the locations and capture directions, and the repetitive structure is configured to perform interconversion among the image features, the temporal features, and the features.

A fifth embodiment of the present invention is an image search device including a feature storage unit configured to store image features extracted for a plurality of images which are captured at one or a plurality of locations and which are given different capture times, a temporal feature extraction unit configured to extract a temporal feature according to a predetermined period from an input time, an image feature estimation unit configured to estimate an image feature of an image captured at the input time on the basis of both the temporal feature extracted by the temporal feature extraction unit and a repetitive structure which is used to perform interconversion between components of the image features and temporal features extracted from the capture times of the plurality of images and which is previously learned on the basis of correlations of periodic change between the components of the image features and the temporal features, and a similar feature image search unit configured to search for an image having an image feature similar to the image feature estimated by the image feature estimation unit on the basis of the image feature estimated by the image feature estimation unit and the respective image features of the plurality of images stored in the feature storage unit.

A sixth embodiment of the present invention is the image search device according to the fifth embodiment, wherein the temporal feature extraction unit is configured to extract the temporal feature including a plurality of variables according to a plurality of different predetermined periods from the input time, and the image feature estimation unit is configured to estimate an image feature of an image captured at the input time on the basis of both the temporal feature extracted by the temporal feature extraction unit and the repetitive structure which is used to perform interconversion between a selected one of the plurality of variables of the temporal feature and a component of the image feature and which is previously learned on the basis of a correlation of periodic change between the component of the image feature and the selected variable of the temporal feature.

A seventh embodiment of the present invention is a capture time estimation device including an image feature extraction unit configured to extract an image feature from an input image, and a capture time estimation unit configured to estimate a capture time at which the input image was captured on the basis of both the image feature extracted by the image feature extraction unit and a repetitive structure which is used to perform interconversion between temporal features which are extracted from capture times of a plurality of images captured at one or a plurality of locations and which are provided according to a predetermined period and components of image features extracted from the plurality of images, the repetitive structure being previously learned on the basis of correlations of periodic change between the components of the image features and the temporal features.

An eighth embodiment of the present invention is the capture time estimation device according to the seventh embodiment, wherein the capture time estimation unit is configured to estimate a capture time at which the input image was captured on the basis of both the image feature extracted by the image feature extraction unit and the repetitive structure which is used to perform interconversion between a variable selected from the temporal feature including a plurality of variables according to a plurality of different predetermined periods and components of image features extracted from the plurality of images and which is previously learned on the basis of correlations of periodic change between the components of the image features and the selected variable of the temporal feature.

A ninth embodiment of the present invention is a repetitive structure extraction method for a repetitive structure extraction device including an image feature extraction unit, a temporal feature extraction unit, and a repetitive structure extraction unit, the repetitive structure extraction method including the image feature extraction unit extracting an image feature for each of a plurality of images which are captured at one or a plurality of locations and which are given different capture times, the temporal feature extraction unit extracting, for each of the plurality of images, a temporal feature according to a predetermined period from a capture time given to the image, and the repetitive structure extraction unit learning, on the basis of the image feature extracted for each of the plurality of images by the image feature extraction unit and the temporal feature extracted for each of the plurality of images by the temporal feature extraction unit, a repetitive structure which is used to perform interconversion between the temporal feature and a component of the image feature and which is provided according to a correlation of periodic change between the component of the image feature and the temporal feature.

A tenth embodiment of the present invention is the repetitive structure extraction method according to the ninth embodiment, wherein the repetitive structure extraction unit is configured to learn the repetitive structure at each of the locations on the basis of the image features extracted from the images captured at the same location and the temporal features extracted from capture times given to the images captured at the same location.

An eleventh embodiment of the present invention is the repetitive structure extraction method according to the ninth embodiment, wherein the repetitive structure extraction unit is configured to learn the repetitive structure on the basis of the image features extracted from the images captured at the plurality of locations, the temporal features extracted from capture times given to the images captured at the plurality of locations, and features representing the locations and capture directions, and the repetitive structure is configured to perform interconversion between the image features, the temporal features, and the features.

A twelfth embodiment of the present invention is an image search method for an image search device including a feature storage unit configured to store image features extracted for a plurality of images which are captured at one or a plurality of locations and which are given different capture times, a temporal feature extraction unit, an image feature estimation unit, and a similar feature image search unit, the image search method including the temporal feature extraction unit extracting a temporal feature according to a predetermined period from an input time, the image feature estimation unit estimating an image feature of an image captured at the input time on the basis of both the temporal feature extracted by the temporal feature extraction unit and a repetitive structure which is used to perform interconversion between components of the image features and temporal features extracted from the capture times of the plurality of images and which is previously learned on the basis of correlations of periodic change between the components of the image features and the temporal features, and the similar feature image search unit searching for an image having an image feature similar to the image feature estimated by the image feature estimation unit on the basis of the image feature estimated by the image feature estimation unit and the respective image features of the plurality of images stored in the feature storage unit.

A thirteenth embodiment of the present invention is a capture time estimation method for a capture time estimation device including an image feature extraction unit and a capture time estimation unit, the capture time estimation method including the image feature extraction unit extracting an image feature from an input image, and the capture time estimation unit estimating a capture time at which the input image was captured on the basis of both the image feature extracted by the image feature extraction unit and a repetitive structure which is used to perform interconversion between temporal features which are extracted from capture times of a plurality of images captured at one or a plurality of locations and which are provided according to a predetermined period and components of image features extracted from the plurality of images, the repetitive structure being previously learned on the basis of correlations of periodic change between the components of the image features and the temporal features.

A fourteenth embodiment of the present invention is a program for causing a computer to function as each unit included in the repetitive structure extraction device according to any one of the first to fourth embodiments, the image search device according to the fifth or sixth embodiment, or the capture time estimation device according to the seventh or eighth embodiment.

Advantageous Effects of Invention

As described above, according to the image search device and method and the program of the present invention, an image feature of an image captured at an input time is estimated on the basis of a repetitive structure which is used to perform interconversion between the temporal feature and a component of the image feature and which is previously learned on the basis of a correlation of periodic change between the component of the image feature and the temporal feature and an image having an image feature similar to the estimated image feature is then searched for. Thus, it is possible to capture image changes according to various lengths of time for a group of images collected at a specific location, thereby enabling search for an image corresponding to an arbitrary time.

Further, according to the capture time estimation device and method and the program of the present invention, a capture time at which an input image was captured is estimated on the basis of a repetitive structure which is used to perform interconversion between the temporal feature and a component of the image feature and which is previously learned on the basis of a correlation of periodic change between the component of the image feature and the temporal feature. Thus, it is possible to capture image changes according to various lengths of time for a group of images collected at a specific location, thereby enabling estimation of a time at which an image was captured.

According to the repetitive structure extraction device and method and the program of the present invention, an image feature and a temporal feature are extracted for each of a plurality of images which are captured at a specific location and which are given different capture times and a repetitive structure for performing interconversion between the temporal feature and a component of the image feature is learned on the basis of a correlation of periodic change between the component of the image feature and the temporal feature. Thus, it is possible to capture image changes according to various lengths of time for a group of images collected at a specific location, thereby enabling learning of a repetitive structure for searching for an image corresponding to an arbitrary time.

BRIEF DESCRIPTION OF DRAWINGS

FIG. 6 is a flowchart showing a capture time estimation processing routine for the capture time estimation device according to the embodiment of the present invention.

FIG. 7 is a diagram showing an experimental result by the repetitive structure extraction device.

DESCRIPTION OF EMBODIMENTS

Hereinafter, embodiments of the present invention will be described in detail with reference to the drawings.

Overview of Embodiment of Present Invention

Embodiments of the present invention relate to a method of automatically recognizing changes of images at a certain location with the lapse of time. With this method, it is possible to estimate an image corresponding to an arbitrary time, in particular in the past or in the future where no images exist.

In an embodiment of the present invention, image changes according to various lengths of time are captured for a group of images collected at a specific location to search for an image corresponding to an arbitrary time.

In particular, repeatedly occurring changes of images, for example, changes of images occurring over the day and night in 1-day periods, are automatically extracted and used without previously specifying the length of time, one day. Even if images captured at a location include only images captured at a specific time, using a repetitive structure makes it possible to reuse other images captured at the location at other times, such that, for example, when images of "night of a certain day, month, and year" are searched for, images of "night of another day, month, and year" can be output as plausible images.

<Configuration of Repetitive Structure Extraction Device According to Embodiment of Present Invention>

Figure 1:
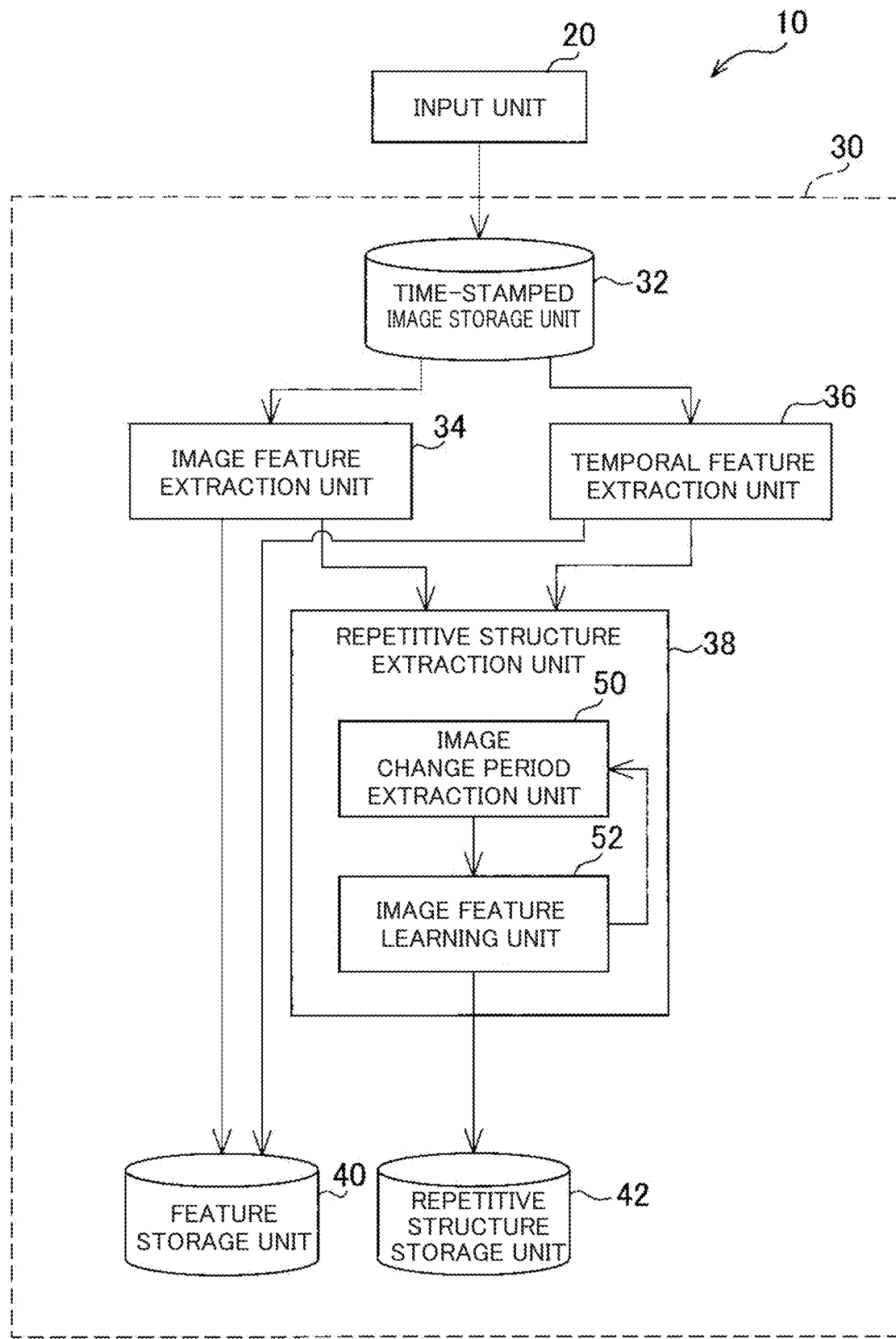
FIG. 1 is a block diagram of a repetitive structure extraction device according to an embodiment of the present invention.

Next, a configuration of a repetitive structure extraction device according to an embodiment of the present invention will be described. As shown in FIG. 1, the repetitive structure extraction device 10 according to the embodiment of the present invention may be formed of a computer including a CPU, a RAM, and a ROM that stores a program or various data for executing a repetitive structure extraction processing routine which will be described later. The repetitive structure extraction device 10 functionally includes an input unit 20 and a calculation unit 30 as shown in FIG. 1.

The input unit 20 receives a plurality of time-stamped images which are captured at a specific location and which are given different capture times.

The calculation unit 30 includes a time-stamped image storage unit 32, an image feature extraction unit 34, a temporal feature extraction unit 36, a repetitive structure extraction unit 38, a feature storage unit 40, and a repetitive structure storage unit 42.

The time-stamped image storage unit 32 stores images captured at a specific location and stamped with a plurality of capture times, which have been received through the input unit 20.

The image feature extraction unit 34 receives as an input thereof only pieces of image data obtained from a plurality of time-stamped images stored in the time-stamped image storage unit 32 and extracts an image feature, which is a feature for capturing temporal changes of images, from each of the pieces of image data and then outputs the extracted image features.

Although the method of extracting image features is not particularly limited, methods shown in Non-Patent Documents 4 and 5 are employed in the present embodiment.

[Non-Patent Document 4]

Y. Jia, E. Shelhamer, J. Donahue, S. Karayev, J. Long, R. Girshick, S. Guadarrama, and T. Darrell. "Caffe: Convolutional architecture for fast feature embedding," arXiv preprint arXiv:1408.5093, 2014.

[Non-Patent Document 5]

K. E. van de Sande, T. Gevers, and C. G. Snoek, "Evaluating Color Descriptors for Object and Scene Recognition," TPAMI, 32(9):1582-1596, 2010.

The temporal feature extraction unit 36 receives as an input thereof only pieces of time data obtained from the plurality of time-stamped images stored in the time-stamped image storage unit 32 and extracts from each of the pieces of time data a temporal feature (expressed by the following symbol in [Math. 1]) including an array of values of a plurality types of variables, each changing in cycles of a certain period with the lapse of time, and then outputs the extracted temporal features.

$$t \qquad \text{[Math. 1]}$$

Although the method of calculating each variable changing in cycles of a certain period is not particularly limited, the temporal feature $t_n(\theta)$ is calculated using an n-dimensional Fourier series in the present embodiment.

$$t_n(\theta) = (\cos(\theta_1)\sin(\theta_1), \ldots, \cos(n\theta_1), \sin(n\theta_1), \ldots, \cos(\theta_c), \sin(\theta_c), \ldots, \cos(n\theta_c), \sin(n\theta_c), t)^T \qquad \text{[Math. 2]}$$

Here, $\theta$ is a vector $(\theta_1, \theta_2, \ldots, \theta_c)$. The c-th element $\theta_c$ of the vector $\theta$ is calculated using a period $T_c$ as follows.

[Math. 3]
$$\theta_c = 2\pi \frac{t \bmod T_c}{T_c}$$

Here, t is a time that increases uniformly without a period and is given as time data. (t mod $T_c$) represents the remainder of division of t by $T_c$.

The repetitive structure extraction unit 38 receives as inputs thereof each image feature extracted by the image feature extraction unit 34 and each temporal feature extracted by the temporal feature extraction unit 36 and learns a model of a repetitive structure which is used to perform interconversion between a variable selected from the plurality of types of variables of the temporal feature and a component of the image feature and which is provided according to the correlation of periodic change between the component of the image feature and the selected variable of the temporal feature. The method of learning the model is not particularly limited and, in the present embodiment, the repetitive structure extraction unit 38 learns the model using the image change period extraction unit 50 and the image feature learning unit 52. With the image features and the temporal features extracted from the plurality of time-stamped images, the image change period extraction unit 50 select variables of temporal features by learning a weight vector of the temporal features such that the correlations between the image features and the temporal features are maximized, thereby extracting periodic changes of the images. With the image features and the temporal features extracted from the plurality of time-stamped images, the image feature learning unit 52 learns a subspace such that the correlations between the image features and the temporal features are maximized, thereby regressing the selected variables of the temporal features as explanatory variables to components of the image features. The repetitive structure extraction unit 38 learns a model of the repetitive structure by alternately repeating the two processes of the image change period extraction unit 50 and the image feature learning unit 52.

Here, the principle of learning the repetitive structure will be described.

Let the following symbol in [Math. 4] be a matrix having, in columns, vectors representing image features extracted respectively from time-stamped images.

$$X \qquad \text{[Math. 4]}$$

Let the following symbol in [Math. 5] be a matrix having, in columns, vectors representing temporal features extracted respectively from time-stamped images.

$$Y \qquad \text{[Math. 5]}$$

When a weight vector used to select variables of temporal features that is learned by the image change period extraction unit 50 is expressed by the following symbol in [Math. 6], and $$v \qquad \text{[Math. 6]}$$

a subspace of image features that is learned by the image feature learning unit 52 is expressed by the following symbol in [Math. 7], $$u \qquad \text{[Math. 7]}$$

the two processes of the image change period extraction unit 50 and the image feature learning unit 52 are equivalent to solving an optimization problem for optimizing an objective function expressed by the following expression (1) in [Math. 8], which corresponds to a partial least squares method with $l_1$-norm regularization.

[Math. 8]

$$u, v = \operatorname{argmin}_{[u,v]} -\operatorname{Cov}(u^T X, v^T Y) + \tau \|v\|_1 \qquad (1)$$
$$\text{s.t. } \|u\|_2^2 \le 1, \|v\|_2^2 \le 1$$

Here, Coy is a function to calculate the correlation between two variables, and $\tau$ is a hyperparameter representing the strength of $l_1$-norm regularization.

$$u^T X \qquad \text{[Math. 9]}$$

This symbol in [Math. 9] represents main components of the image features.

$$v_T Y \qquad \text{[Math. 10]}$$

This symbol in [Math. 10] represents main components of the temporal features.

$$v \qquad \text{[Math. 11]}$$

This symbol in [Math. 11] is a vector indicating which periods most closely follow changes of main components of the image features for a group of overcomplete periodic functions prepared in advance.

$$u,v \qquad \text{[Math. 12]}$$

This vector and subspace in [Math. 12] can be acquired in a plurality of sets in a descending order of correlation and the repetitive structure extraction unit 38 can learn multi-dimensional subspaces.

The feature storage unit 40 stores the image features which are extracted from the time-stamped images by the image feature extraction unit 34 and the temporal features which are extracted from the time-stamped images by the temporal feature extraction unit 36.

The repetitive structure storage unit 42 stores the repetitive structure learned by the repetitive structure extraction unit 38. Specifically, the repetitive structure storage unit 42 stores a repetitive structure expressed by the following vector and subspace in [Math. 13], which is learned by the repetitive structure extraction unit 38.

$$u,v \qquad \text{[Math. 13]}$$

<Configuration of Image Search Device According to Embodiment of Present Invention>

Figure 2:
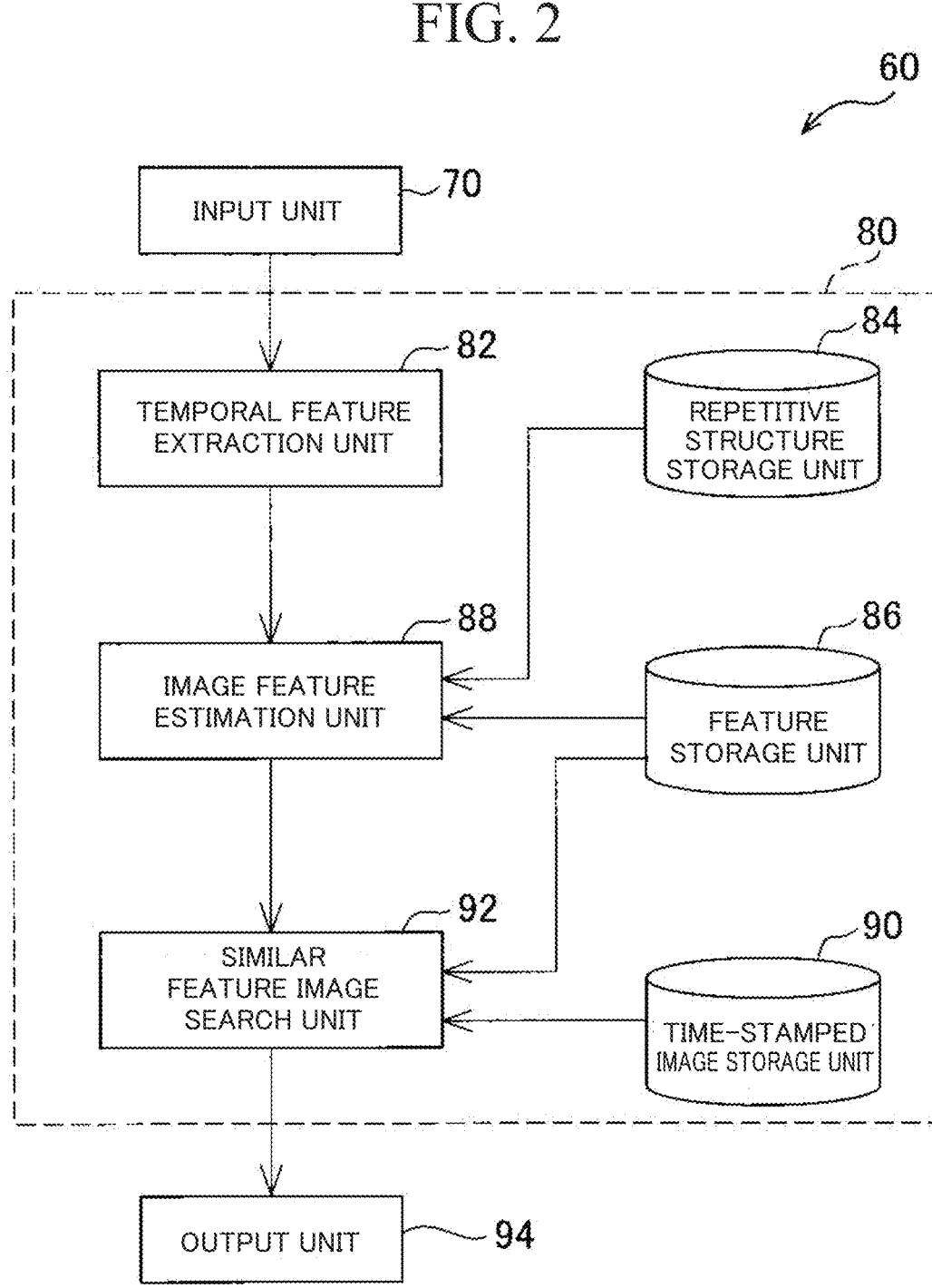
FIG. 2 is a block diagram of an image search device according to the embodiment of the present invention.

Next, a configuration of an image search device according to the embodiment of the present invention will be described. As shown in FIG. 2, the image search device 60 according to the embodiment of the present invention may be formed of a computer including a CPU, a RAM, and a ROM that stores a program or various data for executing an image search processing routine which will be described later. The image search device 60 functionally includes an input unit 70, a calculation unit 80, and an output unit 94 as shown in FIG. 2.

The input unit 70 receives an input of a time.

The calculation unit 80 includes a temporal feature extraction unit 82, a repetitive structure storage unit 84, a feature storage unit 86, an image feature estimation unit 88, a time-stamped image storage unit 90, and a similar feature image search unit 92.

Similar to the temporal feature extraction unit 36, the temporal feature extraction unit 82 extracts a temporal feature from the time received through the input unit 70 and outputs the extracted temporal feature.

The repetitive structure storage unit 84 stores the same repetitive structure as that of the repetitive structure storage unit 42 of the repetitive structure extraction device 10.

Similar to the feature storage unit 40 of the repetitive structure extraction device 10, the feature storage unit 86 stores image features and temporal features extracted from a plurality of time-stamped images The image feature estimation unit 88 estimates and outputs an image feature of an image captured at the input time on the basis of the repetitive structure stored in the repetitive structure storage unit 84, the temporal feature extracted by the temporal feature extraction unit 82, and the image features and the temporal features stored in the feature storage unit 86. Although the method of estimating the image feature is not particularly limited, in the present embodiment, the image feature estimation unit 88 obtains coordinates, in a subspace obtained from the repetitive structure, of the temporal feature calculated from the input time, searches for time-stamped images which are located near the temporal feature in the subspace, and estimates an image feature extracted from an image corresponding to the input time using the average of image features of the retrieved time-stamped images. An image feature extracted from an image corresponding to the input time may also be estimated by another estimation method. For example, the image feature estimation unit 88 may estimate an image feature of an image that is captured at the input time on the basis of the repetitive structure stored in the repetitive structure storage unit 84, the temporal feature extracted by the temporal feature extraction unit 82, and the image features stored in the feature storage unit 86 without using the temporal features stored in the feature storage unit 86. In this case, the image feature estimation unit 88 may use an estimation method which can estimate an image feature extracted from an image corresponding to the input time without using the temporal features stored in the feature storage unit 86.

The similar feature image search unit 92 retrieves, from the plurality of time-stamped images, an image having an image feature close to the image feature which has been estimated for the input time by the image feature estimation unit 88 on the basis of the image features stored in the feature storage unit 86, acquires data of the retrieved image from the time-stamped image storage unit 90, and outputs the acquired image as an output image.

<Configuration of Capture Time Estimation Device According to Embodiment of Present Invention>

Figure 3:
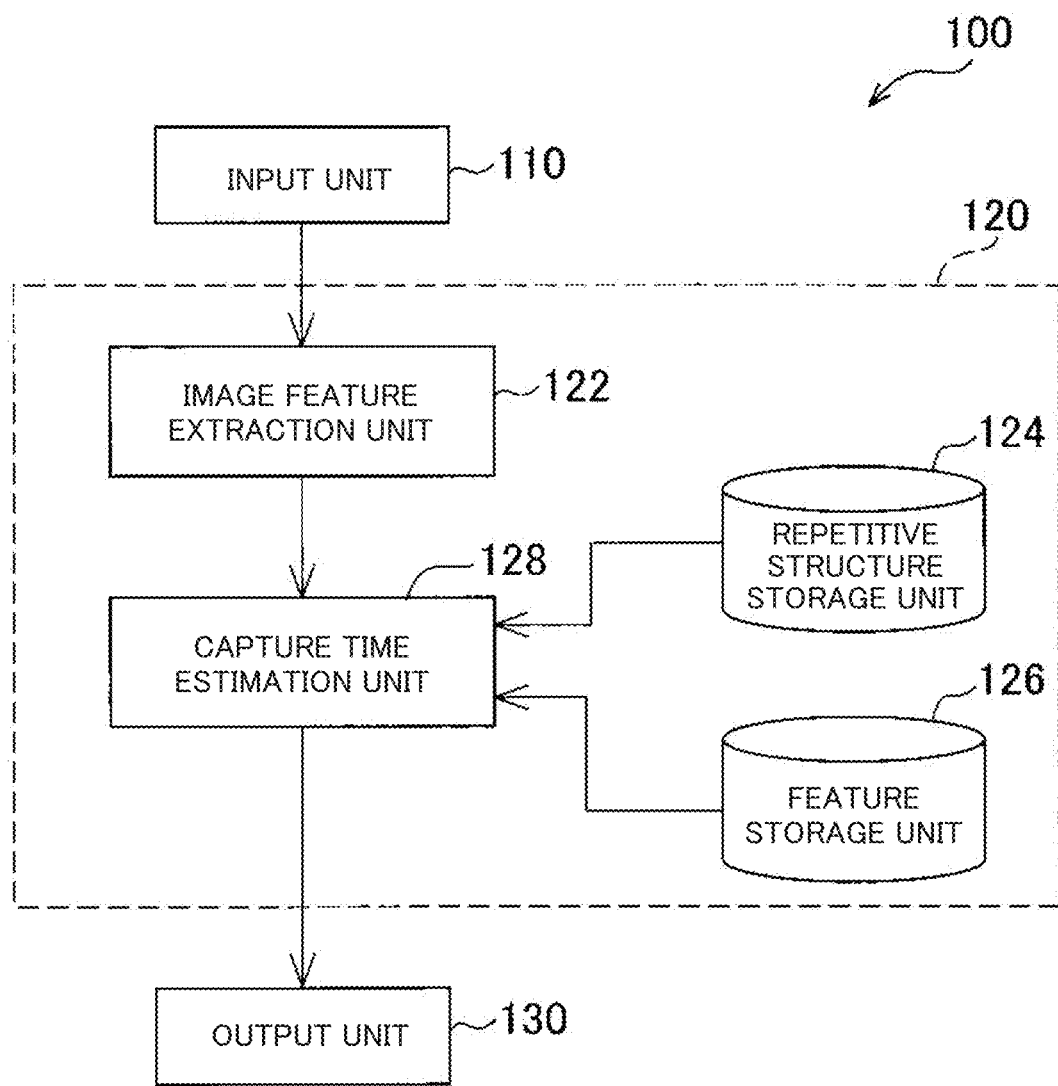
FIG. 3 is a block diagram of a capture time estimation device according to the embodiment of the present invention.

Next, a configuration of a capture time estimation device according to the embodiment of the present invention will be described. As shown in FIG. 3, the capture time estimation device 100 according to the embodiment of the present invention may be formed of a computer including a CPU, a RAM, and a ROM that stores a program or various data for executing a capture time estimation processing routine which will be described later. The capture time estimation device 100 functionally includes an input unit 110, a calculation unit 120, and an output unit 130 as shown in FIG. 3.

The input unit 110 receives an input of an image which was captured at a specific location at an unknown time. This specific location is the same as the specific location of the time-stamped images input in the repetitive structure extraction device 10.

The calculation unit 120 includes an image feature extraction unit 122, a repetitive structure storage unit 124, a feature storage unit 126, and a capture time estimation unit 128.

Similar to the image feature extraction unit 34, the image feature extraction unit 122 extracts an image feature from the image received through the input unit 110 and outputs the extracted image feature.

The repetitive structure storage unit 124 stores the same repetitive structure as that of the repetitive structure storage unit 42 of the repetitive structure extraction device 10.

Similar to the feature storage unit 40 of the repetitive structure extraction device 10, the feature storage unit 126 stores image features extracted from a plurality of time-stamped images.

On the basis of the repetitive structure stored in the repetitive structure storage unit 124 and the image features stored in the feature storage unit 126, the capture time estimation unit 128 estimates a capture time of the input image using the repetitive structure and outputs the estimated capture time. Although the estimation method is not particularly limited, in the present embodiment, the capture time estimation unit 128 uses a subspace that maximizes the correlations between the image features and the temporal features and searches for time-stamped images located near the image feature of the input image in the subspace and then estimates a capture time of the input image using the capture time of the nearest image or the capture times of a plurality of near images. A capture time of the input image may also be estimated by another estimation method. For example, the capture time estimation unit 128 may estimate a capture time of the input image on the basis of the repetitive structure stored in the repetitive structure storage unit 124 and the image feature extracted by the image feature extraction unit 122 without using the image features stored in the feature storage unit 126. In this case, the capture time estimation unit 128 may use an estimation method which can estimate the capture time of the input image without using the image features stored in the feature storage unit 126.

<Operation of Repetitive Structure Extraction Device According to Embodiment of Present Invention>

Figure 4:
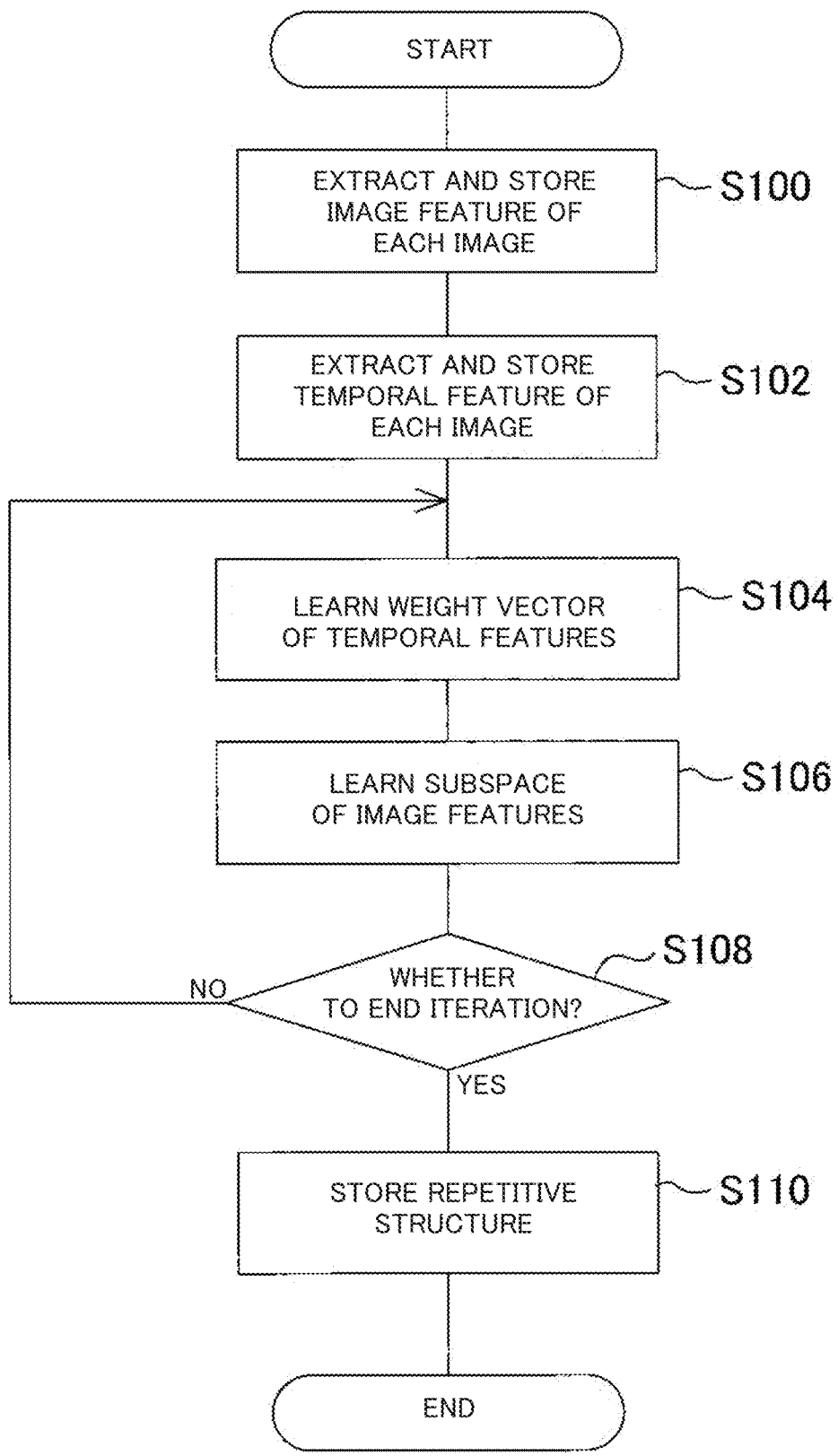
FIG. 4 is a flowchart showing a repetitive structure extraction processing routine for the repetitive structure extraction device according to the embodiment of the present invention.

Next, an operation of the repetitive structure extraction device 10 according to the embodiment of the present invention will be described. Upon receiving a plurality of time-stamped images which are captured at a specific location and which are given different capture times, the repetitive structure extraction device 10 stores the plurality of time-stamped images in the time-stamped image storage unit 32. Then, the repetitive structure extraction device 10 executes a repetitive structure extraction processing routine shown in FIG. 4.

First, in step S100, the image feature extraction unit 34 extracts an image feature from image data of each of the plurality of time-stamped images and stores the extracted image features in the feature storage unit 40.

In step S102, the temporal feature extraction unit 36 extracts a temporal feature from time data of each of the plurality of time-stamped images and stores the extracted temporal features in the feature storage unit 40.

In step S104, the image change period extraction unit 50 performs learning on the basis of the image features extracted in step S100, the temporal features extracted in step S102, and an initial value or a previous value of a subspace of image features expressed by the following symbol in [Math. 14].

$$u \qquad \text{[Math. 14]}$$

Specifically, in the case in which the subspace of image features expressed by the following symbol in [Math. 15] is fixed to the initial value or the previous value, $$u \qquad \text{[Math. 15]}$$

the image change period extraction unit 50 learns a weight vector of temporal features expressed by the following symbol in [Math. 16] so as to optimize the objective function of the above expression (1).

$$v \qquad \text{[Math. 16]}$$

In step S106, the image feature learning unit 52 performs learning on the basis of the image features extracted in step S100, the temporal features extracted in step S102, and an initial value or a previous value of the weight vector of temporal features expressed by the following symbol in [Math. 17].

$$v \qquad \text{[Math. 17]}$$

Specifically, in the case in which the weight vector of temporal features expressed by the following symbol in [Math. 18] is fixed to the initial value or the previous value, $$v \qquad \text{[Math. 18]}$$

the image feature learning unit 52 learns a subspace of image features expressed by the following symbol in [Math. 19] so as to optimize the objective function of the above expression (1).

$$u \qquad \text{[Math. 19]}$$

In step S108, the repetitive structure extraction unit 38 determines whether or not a predetermined iteration ending condition is satisfied. If the iteration ending condition is not satisfied, the repetitive structure extraction unit 38 returns to step S104. On the other hand, if the iteration ending condition is satisfied, the repetitive structure extraction unit 38 proceeds to step S110 to store the subspace of image features and the vector of temporal features expressed by the following symbols in [Math. 20], $$u, v \qquad \text{[Math. 20]}$$

which have been finally learned in the above steps S104 and S106, and then terminates the repetitive structure extraction processing routine.

<Operation of Image Search Device According to Embodiment of Present Invention>

Figure 5:
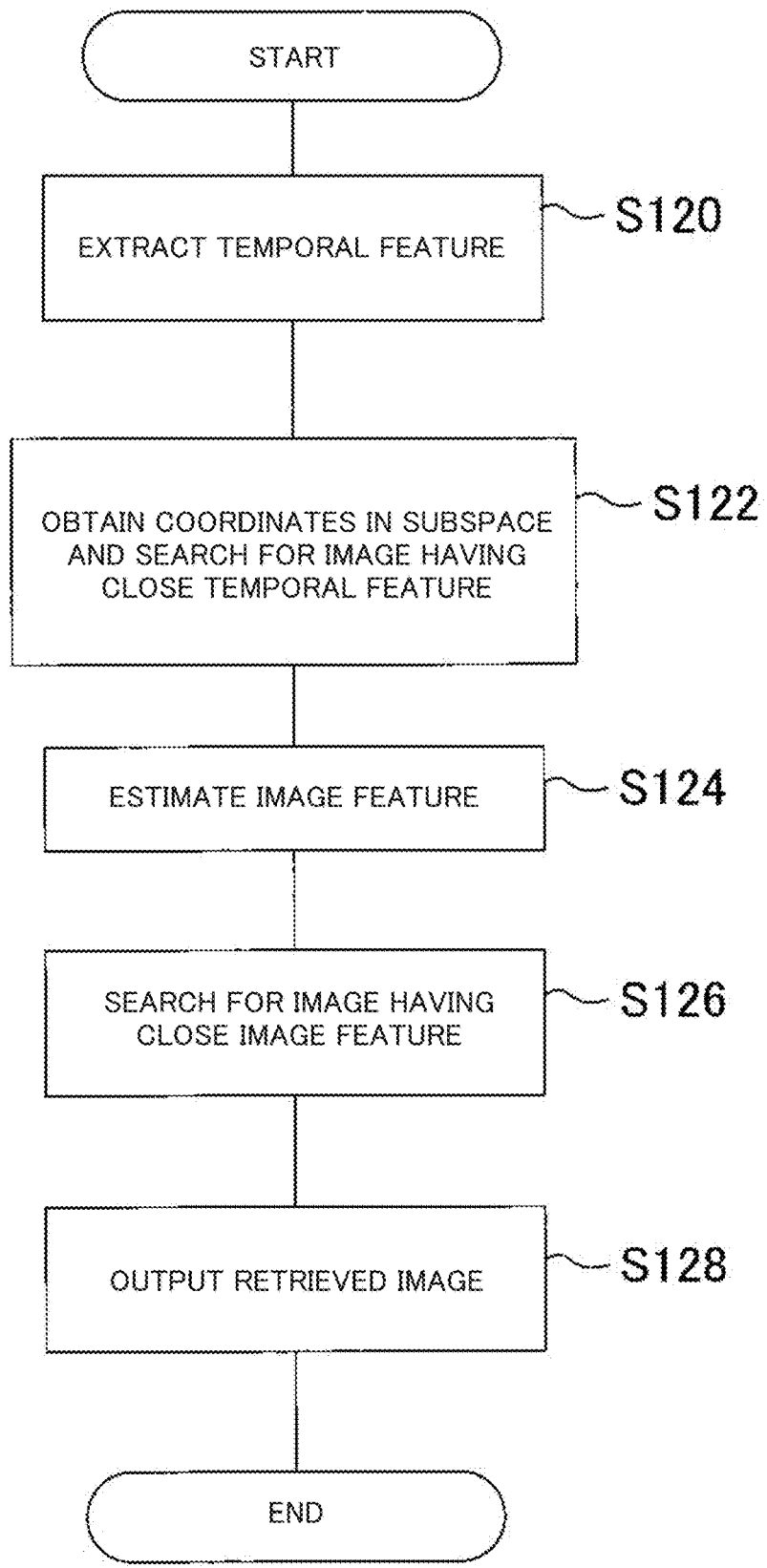
FIG. 5 is a flowchart showing an image search processing routine for the image search device according to the embodiment of the present invention.

Next, an operation of the image search device 60 according to the embodiment of the present invention will be described. Upon receiving an input of a time, the image search device 60 executes an image search processing routine shown in FIG. 5.

First, in step S120, the temporal feature extraction unit 82 extracts a temporal feature from the input time.

Then, in step S122, the image feature estimation unit 88 obtains coordinates in the subspace which correspond to the temporal feature extracted in step S120 on the basis of the repetitive structure stored in the repetitive structure storage unit 84 and searches for an image close to the temporal feature extracted in the step S120 on the basis of the temporal features stored in the feature storage unit 86.

In step S124, the image feature estimation unit 88 estimates an image feature corresponding to the input time on the basis of the image features stored in the feature storage unit 86 and the image retrieved in the above step S122.

In step S126, the similar feature image search unit 92 searches for an image close to the image feature estimated in the above step S124 on the basis of the image features stored in the feature storage unit 86 and the images stored in the time-stamped image storage unit 90.

In step S128, the image retrieved in step S126 is output through the output unit 94 and then the image search processing routine ends.

<Operation of Capture Time Estimation Device According to Embodiment of Present Invention>

Next, an operation of the capture time estimation device 100 according to the embodiment of the present invention will be described. Upon receiving an input of an image which was captured at a specific location at an unknown time, the capture time estimation device 100 executes a capture time estimation processing routine shown in FIG. 6.

First, in step S130, the image feature extraction unit 122 extracts an image feature from the input image.

In step S132, the capture time estimation unit 128 obtains coordinates in the subspace which correspond to the image feature extracted in step S130 on the basis of the repetitive structure stored in the repetitive structure storage unit 84 and searches for an image close to the image feature extracted in the above step S130 on the basis of the image features stored in the feature storage unit 86.

In step S134, the capture time estimation unit 128 estimates a capture time of the input image on the basis of the capture time of the image retrieved in step S132 and the estimated capture time is output through the output unit 130 and then the capture time estimation processing routine ends.

Modified Example

The repetitive structure extraction device 10 according to the above embodiment uses a plurality of images captured at a specific location at different times as images to be learned. However, images to be learned may be captured not only at a specific location but also at a plurality of locations. The directions in which images are captured at the locations may be different from each other. In the case in which the repetitive structure extraction device 10 uses a plurality of images captured at a plurality of locations within an arbitrary duration as images to be learned, expression (2) in [Math. 21] is used instead of expression (1) for learning.

[Math. 21]

$$U, V = \underset{U,V}{\operatorname{argmax}} \left( \frac{1}{N_d} \sum_{n=1}^{N_d} (\operatorname{diag}(U^T x_n y_n V^T) \cdot s_n) \right) \qquad (2)$$

$$= \underset{U,V}{\operatorname{argmax}} \left( \frac{1}{N_d} tr((U^T X) \circ (V^T Y)S) \right)$$

s.t. $\|u_r\|_2^2 \le 1, \|v_r\|_2^2 \le 1, \forall r \in \{1, 2, \ldots, d_r\}$ In expression (2), $N_d$ is the number of images to be input. Vectors $x_n$ and $y_n$ are column vectors respectively representing an image feature and a temporal feature extracted from each time-stamped image. diag (A) is a function to obtain diagonal elements of a matrix A. tr(A) is a function to calculate the sum of the diagonal elements of the matrix A. Matrices X and Y are those having the vectors $x_n$ and $y_n$ in columns. Projection matrices U and V are those having vectors $u_r$ and $y_r$ in columns. The operator "∘" represents the Hadamard product of matrices. A matrix S has vectors $s_n$ in columns.

$$U^T x_n \qquad \text{[Math. 22]}$$

This symbol in [Math. 22] is a $d_r$-dimensional vector obtained by projecting an image feature extracted from an n-th image with a projection matrix U composed of $d_r$ projection axes.

$$y_n V^T \qquad \text{[Math. 23]}$$

This symbol in [Math. 23] is a $d_r$-dimensional vector obtained by projecting a temporal feature extracted from the nth image with a projection matrix V composed of $d_r$ projection axes.

[Math. 24]

$$s_n = W a_n, \qquad (3)$$
$$a_n = p_n l_n^T$$

As shown in expression (3) in [Math. 24], a vector $s_n$ is obtained, for example, by multiplying a vector $a_n$ determined definitely from locations at which and directions in which images were captured by a matrix W representing correlations between the locations and the directions. The vector $a_n$ is a feature representing locations at which and directions in which images were captured. Each element of the vector $s_n$ has a value from 0 to 1. The vector $s_n$ is obtained by calculating a transposed matrix product of a vector $I_n$ having the same number of dimensions as the number of locations at which images were captured and a vector $p_n$ having the same number of dimensions as the number of directions in which images were captured. When it is determined that the number of directions in which images were captured is one at each location, the vector $a_n$ is a vector in which only one of the (the number of locations)×(the number of directions) elements is 1.

The directions in which images were captured may be obtained from meta-information added to time-stamped images or may be obtained by performing k-means clustering on time-stamped images captured at the same location. The matrix W representing the correlations between the locations at which and the directions in which time-stamped images were captured is a matrix obtained through optimization of the objective function of expression (2), similar to the projection matrices U and V.

When the objective function of expression (2) is optimized, a process of updating one of the matrices U, V, and W with the other two being fixed to an initial value or a previous value is iterated sequentially for each of the matrices U, V, and W. This iteration is continued until a predetermined ending condition is satisfied. For example, a condition that an amount of change in the matrix U, V, or W made by update be smaller than a predetermined threshold value may be used as the ending condition. The iteration ends when the amount of change falls below the threshold value.

By performing learning through optimization using expression (2) as an objective function, the repetitive structure extraction device 10 can obtain a repetitive structure which is used to perform interconversion between features representing capture locations and directions and image features and temporal features extracted respectively from $N_d$ images captured at a plurality of locations and which is provided according to the correlations of periodic change. The repetitive structure is obtained as matrices U, V, and W.

By using the repetitive structure obtained on the basis of expression (2), the image search device 60 and the capture time estimation device 100 can similarly perform their processing on time-stamped images captured at a plurality of locations.

Experimental Example

In order to verify the above embodiment, an experiment was conducted using data of time-stamped images of the Kiyomizu-dera's stage acquired using a Flickr (registered trademark) API from an image sharing site Flickr (registered trademark). Images of the Kiyomizu-dera captured up to 2014 were acquired and then images of the stage which were captured with a similar composition and whose capture times were subjectively determined to be correct were manually extracted from them to acquire a total of 570 Kiyomizu-dera images from 2002 to 2014.

5-fold cross validation was used for model learning.

FIG. 7 shows a repetitive structure extracted by the repetitive structure extraction device 10. In a scatter diagram for images, the horizontal represents the main components of image features and the vertical represents the capture time, which means that the upper image, the newer. Bar graphs plot the intensities with which the main components of the image features are related to time variables of 1 to 24 hours, 1 to 365 days, and 2 to 4 years and a time variable expressed in the original one dimension, that is, the absolute values of the correlations between the main components and the time variables. From this scatter diagram, it can be seen that changes in the day and night corresponding to changes in 24-hour periods can be extracted as a repetitive structure.

Figure 8A:
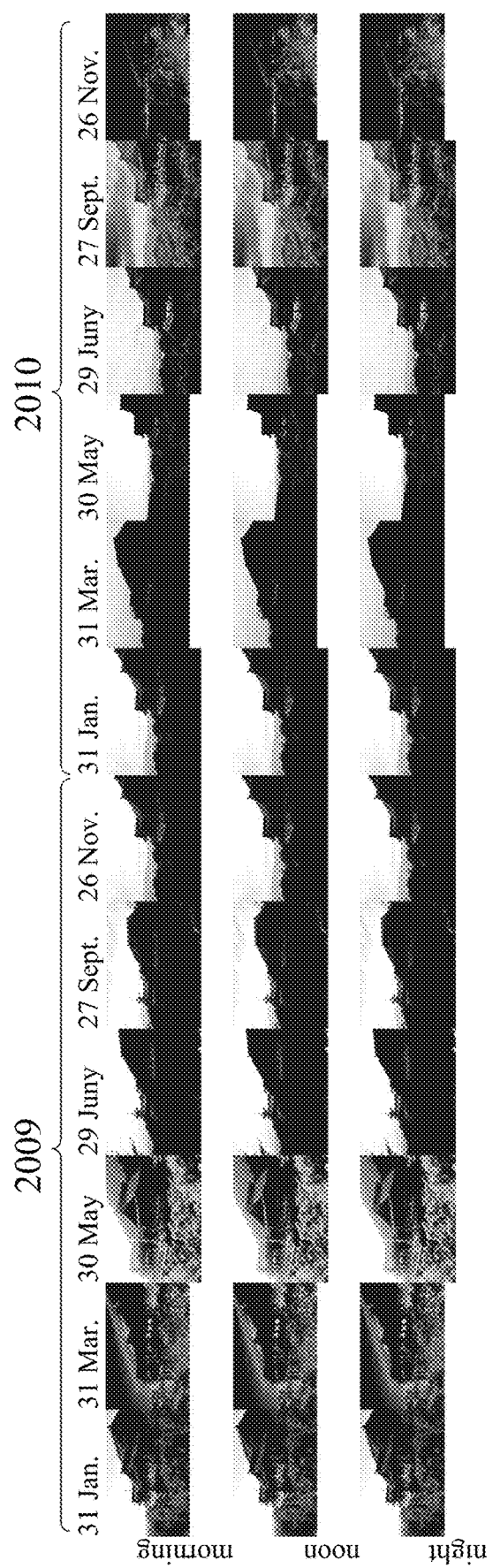
FIG. 8A is a diagram showing an experimental result by a simple search.
Figure 8B:
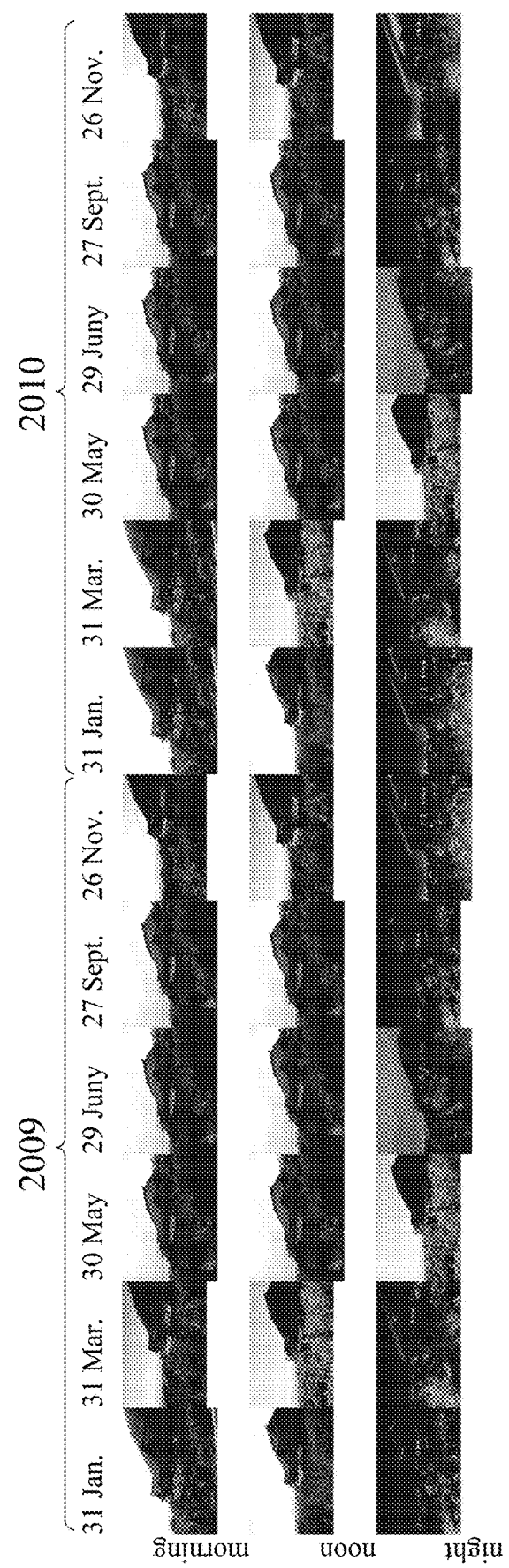
FIG. 8B is a diagram showing an experimental result by the image search device.

Next, FIG. 8B shows an example of images that the image search device 60 finally outputs for temporal features having only 1-day and 1-year periods extracted by the repetitive structure extraction device 10 when the input time is the morning, noon and night of a 12th day from 2009 to 2010. FIG. 8A shows an example when images whose capture times are closest to the input time were searched for as a method to be compared. It can be seen that the method of the present embodiment can output plausible images by satisfactorily retrieving images of different years, months, and days, whereas changes in a day cannot be output satisfactorily when images captured at times which are simply closest to the input time in a one-dimensional time space are displayed.

As described above, in the repetitive structure extraction device according to the embodiment of the present invention, an image feature and a temporal feature are extracted for each of a plurality of images which are captured at one or a plurality of locations and which are given different capture times and a repetitive structure for performing interconversion between a selected variable of the temporal feature and a component of the image feature is learned on the basis of a correlation of periodic change between the component of the image feature and the selected variable of the temporal feature. Thus, it is possible to capture image changes according to various lengths of time for a group of images collected at one or a plurality of locations, thereby enabling learning of a repetitive structure for searching for an image corresponding to an arbitrary time.

In addition, in the image search device according to the embodiment of the present invention, an image feature of an image captured at an input time is estimated on the basis of a repetitive structure which is used to perform interconversion between a selected variable of the temporal feature and a component of the image feature and which is previously learned on the basis of a correlation of periodic change between the component of the image feature and the selected variable of the temporal feature and then an image having an image feature similar to the estimated image feature is searched for. Thus, it is possible to capture image changes according to various lengths of time for a group of images collected at one or a plurality of locations, thereby enabling search for an image corresponding to an arbitrary time.

Further, in the capture time estimation device according to the embodiment of the present invention, a capture time at which an input image was captured is estimated on the basis of a repetitive structure which is used to perform interconversion between a selected variable of the temporal feature and a component of the image feature and which is previously learned on the basis of a correlation of periodic change between the component of the image feature and the selected variable of the temporal feature. Thus, it is possible to capture image changes according to various lengths of time for a group of images collected at one or a plurality of locations, thereby enabling estimation of a time at which an image was captured.

Further, in the embodiment of the present invention, attention is paid to image changes which are viewed repeatedly in time to extract a repetitive structure in which components of image features change in arbitrary periods, variables of the temporal features which can satisfactorily temporally express the periods of changing images are selected on the basis of the extracted repetitive structure, and the relationship between the components of the image features and the variables of the temporal features is learned. Thus, it is possible to estimate an image feature corresponding to a desired time, to search for a known image on the basis of the estimated image feature, and to display an image corresponding to the desired time.

It should be noted that the present invention is not limited to the above embodiments and various modifications and applications are possible without departing from the spirit of the present invention.

For example, although the case in which the repetitive structure extraction device, the image search device, and the capture time estimation device are formed as separate devices has been described by way of example in the above embodiment, the repetitive structure extraction device and the image search device or the capture time estimation device may be formed as a single device.

In addition, although the case in which the repetitive structure for regressing a selected variable of a temporal feature as an explanatory variable to a component of an image feature is used has been described by way of example, the present invention is not limited to this. Another map which enables interconversion between the selected variable of the temporal feature and the component of the image feature may be used.

Further, although the case in which a repetitive structure is extracted so as to maximize the correlation of periodic change between the component of the image feature and the selected variable of the temporal feature has been described by way of example, the present invention is not limited to this and the repetitive structure may be extracted without maximizing the correlation.

Furthermore, although the embodiment in which the program is already installed has been described in the specification of the present application, the program may be provided as being stored in a computer readable non-transitory recording medium and may also be provided via a network.

INDUSTRIAL APPLICABILITY

The present invention is applicable to applications in which it is necessary to capture image changes according to various lengths of time for a group of images collected at one or a plurality of locations to learn a repetitive structure for searching for an image, to search for an image corresponding to an arbitrary time, or to estimate the time at which an image was captured.

REFERENCE SIGNS LIST

10 Repetitive structure extraction unit
20, 70, 110 Input unit
30, 80, 120 Calculation unit
32, 90 Time-stamped image storage unit
34, 122 Image feature extraction unit
36, 82 Temporal feature extraction unit
38 Repetitive structure extraction unit
40, 86, 126 Feature storage unit
42, 84, 124 Repetitive structure storage unit
50 Image change period extraction unit
52 Image feature learning unit
60 Image search device
88 Image feature estimation unit
92 Similar feature image search unit
94, 130 Output unit
100 Capture time estimation device
128 Capture time estimation unit

The invention claimed is:

1. A repetitive structure extraction device comprising:
an image feature extraction unit configured to extract an image feature from each of a plurality of images which are captured at one or a plurality of locations and which are given different capture times;
a temporal feature extraction unit configured to extract, a temporal feature according to a predetermined period from a capture time given to each of the plurality of images; and
a repetitive structure extraction unit configured to learn, on a basis of the image feature extracted from each of the plurality of images by the image feature extraction unit and the temporal feature extracted from each of the plurality of images by the temporal feature extraction unit, a repetitive structure which is used to perform interconversion between the temporal feature and a component of the image feature and which is provided according to a correlation of periodic change between the component of the image feature and the temporal feature.

2. The repetitive structure extraction device according to claim 1, wherein the temporal feature extraction unit is configured to extract the temporal feature including a plurality of variables according to a plurality of different predetermined periods from the capture time given to each of the plurality of images, and
the repetitive structure extraction unit is configured to learn, on a basis of the image feature extracted from each of the plurality of images by the image feature extraction unit and the temporal feature extracted from each of the plurality of images by the temporal feature extraction unit, the repetitive structure which is used to perform interconversion between a selected variable of the plurality of variables of the temporal feature and a component of the image feature and which is provided according to a correlation of periodic change between the component of the image feature and the selected variable of the temporal feature.

3. The repetitive structure extraction device according to claim 1, wherein the repetitive structure extraction unit is configured to learn the repetitive structure at each of the plurality of locations on a basis of image features extracted from images captured at a same location among the plurality of images and temporal features extracted from capture times given to the images captured at the same location.

4. The repetitive structure extraction device according to claim 1, wherein the repetitive structure extraction unit is configured to learn the repetitive structure on a basis of the image features extracted from the plurality of images captured at the plurality of locations, temporal features extracted from capture times given to the plurality of images captured at the plurality of locations, and location features representing the plurality of locations and capture directions, and
the repetitive structure is configured to perform interconversion among the image features, the temporal features, and the location features.

5. A repetitive structure extraction method for a repetitive structure extraction device including an image feature extraction unit, a temporal feature extraction unit, and a repetitive structure extraction unit, the repetitive structure extraction method comprising:
the image feature extraction unit extracting an image feature from each of a plurality of images which are captured at one or a plurality of locations and which are given different capture times;
the temporal feature extraction unit extracting a temporal feature according to a predetermined period from a capture time given to each of the plurality of images; and
the repetitive structure extraction unit learning, on a basis of the image feature extracted from each of the plurality of images by the image feature extraction unit and the temporal feature extracted from each of the plurality of images by the temporal feature extraction unit, a repetitive structure which is used to perform interconversion between the temporal feature and a component of the image feature and which is provided according to a correlation of periodic change between the component of the image feature and the temporal feature.

6. The repetitive structure extraction method according to claim 5, wherein the repetitive structure extraction unit is configured to learn the repetitive structure at each of the plurality of locations on a basis of image features extracted from images captured at a same location among the plurality of images and temporal features extracted from capture times given to the images captured at the same location.

7. The repetitive structure extraction method according to claim 5, wherein the repetitive structure extraction unit is configured to learn the repetitive structure on a basis of image features extracted from the plurality of images captured at the plurality of locations, temporal features extracted from capture times given to the plurality of images captured at the plurality of locations, and location features representing the plurality of locations and capture directions, and the repetitive structure is configured to perform interconversion among the image features, the temporal features, and the location features.

8. A non-transitory computer-readable recording medium having a program for causing a computer to function as each unit included in the repetitive structure extraction device according to claim 1.

* * * * *